(12) United States Patent
Agrawal et al.

(10) Patent No.: US 9,788,314 B2
(45) Date of Patent: Oct. 10, 2017

(54) BASE TRANSCEIVER STATION FOR REDUCING CONGESTION IN COMMUNCATION NETWORK

(71) Applicant: FREESCALE SEMICONDUCTOR, INC., Austin, TX (US)

(72) Inventors: Girraj K. Agrawal, Noida (IN); Somvir Dahiya, Bangalore (IN); Rajan Kapoor, Noida (IN); Arvind Kaushik, Ghaziabad (IN); Vincent Martinez, Toulouse (FR)

(73) Assignee: NXP USA, INC., Austin, TX (US)

( * ) Notice: Subject to any disclaimer, the term of this patent is extended or adjusted under 35 U.S.C. 154(b) by 20 days.

(21) Appl. No.: 14/957,618

(22) Filed: Dec. 3, 2015

(65) Prior Publication Data

US 2017/0164333 A1 Jun. 8, 2017

(51) Int. Cl.
| | |
|---|---|
| H04W 72/00 | (2009.01) |
| H04W 72/04 | (2009.01) |
| H04B 1/38 | (2015.01) |
| H04B 1/44 | (2006.01) |
| H04W 88/08 | (2009.01) |

(52) U.S. Cl.
CPC ............ *H04W 72/042* (2013.01); *H04B 1/38* (2013.01); *H04B 1/44* (2013.01); *H04W 88/08* (2013.01)

(58) Field of Classification Search
CPC ..... H04W 16/10; H04W 16/14; H04W 28/16; H04W 72/04; H04W 76/02; H04W 72/042; H04W 88/08; H04B 1/38; H04B 1/44

USPC .......................................................... 455/450
See application file for complete search history.

(56) References Cited

U.S. PATENT DOCUMENTS

| | | | |
|---|---|---|---|
| 6,185,438 B1* | 2/2001 | Fox ........................ | H04W 88/08 455/560 |
| 7,675,887 B2 | 3/2010 | Hoshina | |
| 8,953,484 B2 | 2/2015 | Oguchi | |
| 2003/0093628 A1 | 5/2003 | Matter | |
| 2005/0207406 A1 | 9/2005 | Reme | |
| 2008/0320240 A1* | 12/2008 | Savic .................... | G11C 7/1075 711/151 |
| 2010/0131955 A1* | 5/2010 | Brent ..................... | G06F 9/4843 718/103 |
| 2010/0134330 A1* | 6/2010 | Sakaguchi .......... | H03M 7/4006 341/51 |
| 2010/0195607 A1* | 8/2010 | Lee .................... | H04W 74/0866 370/329 |
| 2010/0329136 A1 | 12/2010 | Murata | |
| 2011/0069787 A1* | 3/2011 | Lee ..................... | H04L 27/0002 375/322 |
| 2012/0114050 A1* | 5/2012 | Osterling ............... | H04B 7/024 375/259 |
| 2014/0023048 A1* | 1/2014 | Vu .......................... | H04B 7/26 370/336 |

(Continued)

*Primary Examiner* — Keith Fang
*Assistant Examiner* — B. M. M Hannan
(74) *Attorney, Agent, or Firm* — Charles E. Bergere

(57) ABSTRACT

A base transceiver station (BTS) includes dedicated memories to store uplink real-time (RT) data received by way of an antenna of the BTS and downlink RT data generated by processors of the BTS. The dedicated memories serve a dedicated number of processors, which prevents over-run and under-run of antenna buffers and provides deterministic data flow necessary to stream time-critical uplink and downlink RT data. Thus, a high and dedicated bandwidth for the uplink and downlink RT data is ensured.

3 Claims, 3 Drawing Sheets

(56) References Cited

U.S. PATENT DOCUMENTS

2014/0241243 A1     8/2014   Singh et al.
2014/0329553 A1*   11/2014   Nakashima ......... H04W 52/365
                                                                                                   455/522

* cited by examiner

BASE TRANSCEIVER STATION FOR REDUCING CONGESTION IN COMMUNCATION NETWORK

BACKGROUND

The present invention relates generally to communication networks, and, more particularly, to a base transceiver station that reduces congestion in a communication network.

A communication network typically includes base transceiver stations (BTSs) for connecting devices, such as user equipment (UE) of the communication network. A BTS and UE communicate using RF signals in accordance with communication standards such as Long-Term Evolution (LTE), LTE-Advanced (LTE-A), High Speed Packet Access (HSPA), and other third generation partnership project (3GPP) standards.

FIG. 1 is a schematic block diagram of a conventional BTS 100. The BTS 100 is in communication with multiple UE and other network devices (not shown). The BTS 100 includes a hardware accelerator 102, a processor 104, a level-2 (L2) cache memory 106, a random access memory (RAM) 108, a level-3 (L3) cache memory 110, and an antenna interface system (AIS) 112 that are connected by way of first and second system busses 114 and 116, as shown. The first and second system busses 114 and 116 may be Advanced Extensible Interconnect (AXI) system busses.

The AIS 112 receives uplink RF signals (i.e., uplink real-time (RT) data) from a UE (not shown) and stores the uplink RT data in the L2 cache memory 106 (i.e., in antenna buffers of the L2 cache memory 106). The processor 104 fetches the uplink RT data from the L2 cache memory 106 and processes the data to acquire uplink information. The processor 104 generates downlink RT data, based on intermediate downlink data received from upper layers (such as layer 3) and stores the downlink RT data in the L2 cache memory 106 (i.e., in the antenna buffers). The AIS 112 fetches the downlink RT data from the L2 cache memory 106 and transmits it to the UE.

If the L2 cache memory 106 is busy servicing a memory request from any component of the BTS 100, the L2 cache memory 106 may be inaccessible to the other components. For example, if the L2 cache memory 106 is busy servicing a memory request generated by the hardware accelerator 102, the L2 cache memory 106 may be inaccessible to the processor 104 and the AIS 112. Further, if there is a cache miss in the L2 cache memory 106, the L2 cache memory 106 fetches the required data from the L3 cache memory 110 (or the RAM 108) by way of the second system bus 116. Thus, if the L2 cache memory 106 is inaccessible to the AIS 112 when uplink RT data is received by the AIS 112, the AIS 112 cannot store the uplink RT data in the L2 cache memory 106, leading to an over-run of the uplink antenna buffers, and hence, loss of the uplink RT data. Similarly, if the L2 cache memory 106 is busy servicing a memory request, the L2 cache memory 106 may be inaccessible to the AIS 112 for a longer period of time, causing an under-run of the downlink antenna buffers and disrupting the synchronization between the BTS 100 and the UE. This technique is inefficient as it does not provide deterministic data flow for streaming time-critical uplink and downlink RT data, leading to congestion in the communication network.

Known techniques to overcome the aforementioned problem include using the L2 cache memory 106 only for uplink and down-link RT data, increasing the size of the L2 cache memory 106, or increasing the number of interfaces with the L2 cache memory 106. These techniques result in an increase in circuit area, and are not efficient.

It would be advantageous to have a BTS that reduces congestion in the communication network and reduces instances of communication failure.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION

Figure 1:
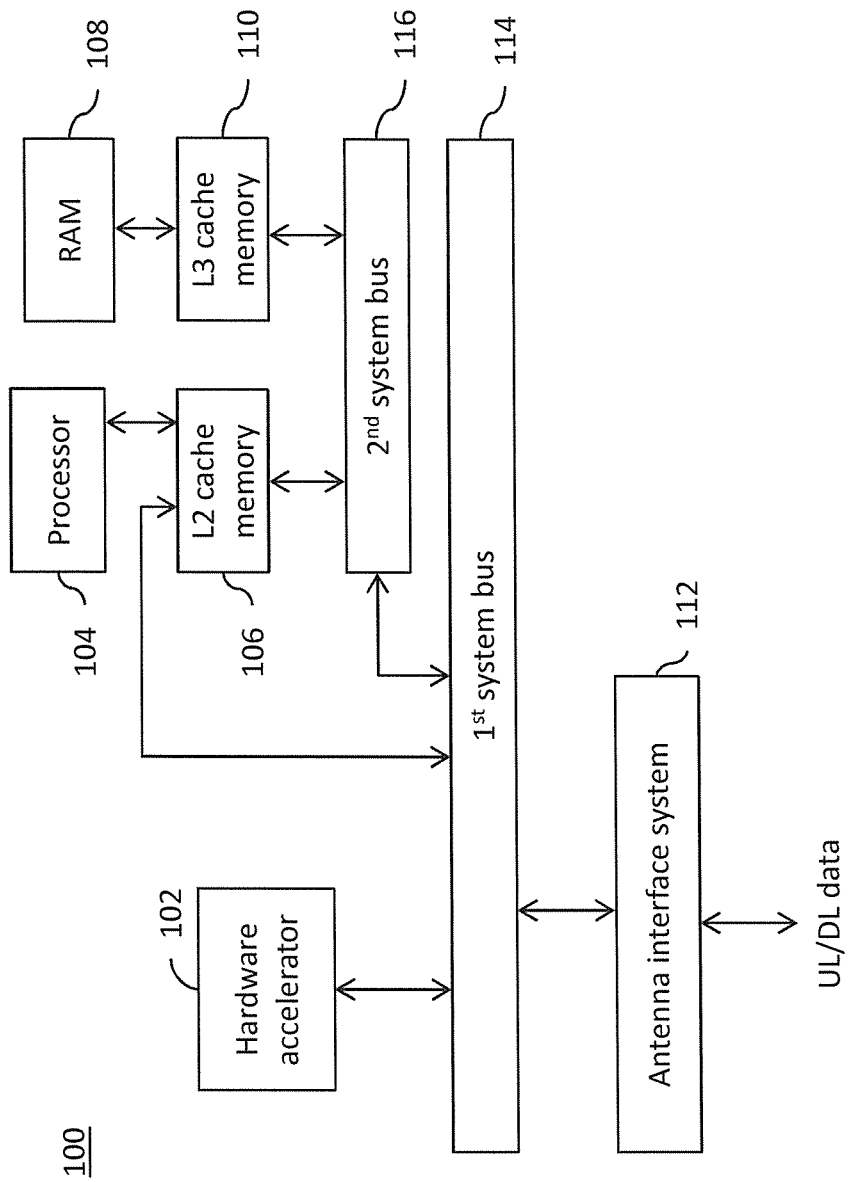
FIG. 1 is a schematic block diagram of a conventional base transceiver station (BTS)

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention.

In an embodiment of the present invention, a base transceiver station (BTS) is provided. The BTS includes an antenna interface system (AIS), uplink and downlink random-access memories (UL RAM and DL RAM, respectively), first and second direct memory access (DMA) controllers, a cache memory, and a set of processors including a first processor. The AIS receives uplink real-time (RT) data and stores the uplink RT data in the UL RAM. The first DMA controller fetches the uplink RT data from the UL RAM and stores the uplink RT data in the cache memory. The first processor fetches the uplink RT data from the cache memory for baseband decoding. The second DMA controller fetches downlink RT data from at least one of the cache memory and at least one processor of the set of processors and stores the downlink RT data in the DL RAM. The AIS fetches the downlink RT data from the DL RAM and transmits the downlink RT data.

In another embodiment of the present invention, a BTS is provided. The BTS includes an AIS, UL and DL RAMs, first and second DMA controllers, a cache memory, and a set of processors including first and second processors. The AIS receives first and second uplink RT data and stores the first and second uplink RT data in the UL RAM. The first DMA controller fetches the first uplink RT data from the UL RAM and stores the first uplink RT data in the cache memory. The first processor fetches the first uplink RT data from the cache memory for baseband decoding. The first DMA controller further fetches the second uplink RT data from the UL RAM and provides the second uplink RT data to the second processor for baseband decoding. The second DMA controller fetches downlink RT data from at least one of the cache memory and at least one of the processors and stores the downlink RT data in the DL RAM. The AIS fetches the downlink RT data from the DL RAM and transmits the downlink RT data.

In yet another embodiment of the present invention, a method implemented in a BTS is provided. The method includes receiving uplink RT data at an AIS. The AIS stores the uplink RT data in a UL RAM. The UL RAM is a dedicated RAM for storing the uplink RT data. A first DMA controller fetches the uplink RT data from the UL RAM and stores the uplink RT data in a cache memory. A first processor of a set of processors fetches the uplink RT data from the cache memory for baseband decoding. A second DMA controller fetches downlink RT data from at least one of the cache memory and a processor of the set of processors and stores the downlink RT data in a DL RAM. The AIS fetches the downlink RT data from the DL RAM and transmits the downlink RT data.

Various embodiments of the present invention provide a BTS including an AIS, a UL RAM, a DL RAM, first and second DMA controllers, a cache memory, and a set of processors. The AIS receives a stream of uplink RT data and stores the uplink RT in the UL RAM. In a data transfer cycle, the first DMA controller provides a portion (i.e., bytes) of the uplink RT data stream, stored in the UL RAM, to either a processor of the set of processors or the cache memory. The location (i.e., either of a processor or the cache memory) to which the data is to be transferred may be provided to the first DMA controller by a processor or controller. The processors decode the uplink RT data according to a communication standard and store intermediate uplink data, generated during processing of the uplink RT data, which is received from the first DMA controller or fetched from the cache memory. The intermediate uplink data is used by upper layers. The processors generate downlink RT data, based on intermediate downlink data received from the upper layers. The second DMA controller fetches the downlink RT data and stores it in the DL RAM. The AIS fetches the downlink RT data from the DL RAM and transmits it.

The UL RAM and the DL RAM serve a dedicated number of processors. Thus, the cache memory does not have to store all the uplink and downlink RT data and hence, there is a dedicated bandwidth for the uplink and downlink RT data. This avoids loss of RT data even if the cache memory is inaccessible, and hence, communication failure is avoided. Since the cache memory does not store all of the uplink RT data received by the BTS and the downlink RT data generated by the processors, the size of the cache memory can be reduced to achieve power and cost reduction. The cache memory may even be used to store data of other cache memories and a system RAM, and thereby reduce occurrence of cache misses.

Figure 2:
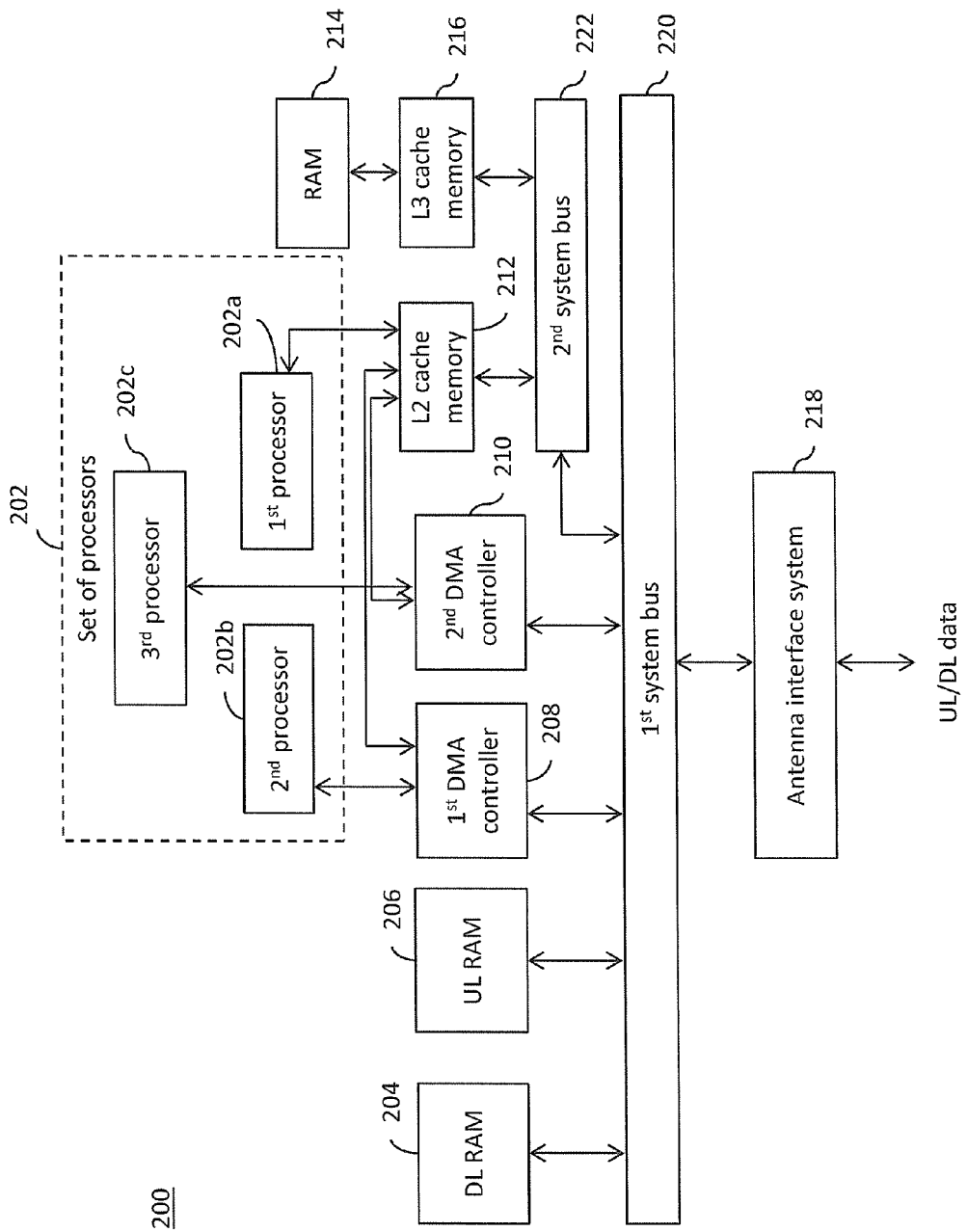
FIG. 2 is a schematic block diagram of a BTS in accordance with an embodiment of the present invention.

Referring now to FIG. 2, a schematic block diagram of a base transceiver station (BTS) 200 in accordance with an embodiment of the present invention is shown. The BTS 200 includes a set of processors 202 (hereinafter referred to as "processors 202"). The processors 202, three of which are shown, include first through third processors 202*a*-202*c*. The BTS 200 also includes a downlink random-access memory (DL RAM) 204, an uplink random-access memory (UL RAM) 206, first and second direct memory access (DMA) controllers 208 and 210, a level-2 (L2) cache memory 212, a RAM 214, a level-3 (L3) cache memory 216, and an antenna interface system 218 that are connected by way of first and second system buses 220 and 222. The antenna interface system 218 may include various antenna interfaces such as an antenna interface controller (AIC), a common public radio interface (CPRI) controller, and a digital front-end (DFE) interface. The first and second system buses 220 and 222 may be Advanced Extensible Interconnect (AXI) system buses. Examples of the RAM 214 include, but are not limited to, static RAMs (SRAMs), dynamic RAMs (DRAMs), and double data rate synchronous DRAMs (DDR SDRAMs). The BTS 200 is in communication with multiple user equipment (UE) (not shown) by way of radio-frequency (RF) signals.

The UL RAM 206 is a dedicated memory for storing uplink real-time data, and the DL RAM 204 is a dedicated memory for storing downlink real-time data. The UL RAM 206 and the DL RAM 204 are physically separate from the L2 cache memory 212. Further, the UL RAM 206 and the DL RAM 204 may be physically separate from each other or may even be partitions of a single memory. The processors 202 include general-purpose processing units and special-purpose processing units. An example of a special-purpose processing unit is a hardware accelerator.

The antenna interface system 218 receives a stream of uplink real-time data from a UE and stores the uplink real-time data in the UL RAM 206. In one embodiment, the uplink real-time data is received as sub-frames transmitted by the UE to the BTS 200. The antenna interface system 218 includes radio-frequency (RF) transceivers (not shown) that convert the uplink real-time data into in-phase and quadrature-phase (I/Q) components. Thus, the uplink real-time data is stored in the UL RAM 206 as I/Q components.

The first DMA controller 208 is connected to the UL RAM 206 by way of the first system bus 220, the L2 cache memory 212, and the second processor 202*b*. In a data transfer cycle, the first DMA controller 208 fetches the uplink real-time data from the UL RAM 206 and either stores the uplink real-time data in the L2 cache memory 212 or provides the uplink real-time data to the second processor 202*b* for baseband processing. Examples of baseband processing include, but are not limited to, physical random access channel (PRACH) decoding and physical uplink shared channel (PUSCH) decoding. The first DMA controller 208 fetches and transfers data from the UL RAM 206 to the desired location (i.e., to the desired component) when it is triggered to perform the data transfer. In one embodiment, the location to which the uplink real-time data is to be transferred, which depends on the type of baseband processing (i.e., decoding) required for the uplink real-time data, is included in a descriptor, which may be provided to the first DMA controller 208 by a processor 202 or a controller (not shown). For each data transfer cycle, a descriptor is provided to the first DMA controller 208. Thus, in a data transfer cycle, the first DMA controller 208 fetches and transfers data from the UL RAM 206 to the second processor 202*b* or the L2 cache memory 212, based on the descriptor. In one embodiment, the BTS 200 includes a timer (not shown) that triggers the first DMA controller 208 after a predetermined time period to fetch and transfer the uplink real-time data from the UL RAM 206 to the desired location. In another embodiment, the BTS 200 includes a counter (not shown) that counts the number of bytes of the uplink real-time data stored in the UL RAM 206 and triggers the first DMA controller 208 to fetch and transfer the uplink real-time data from the UL RAM 206 to the desired location when the number of bytes of the uplink real-time data in the UL RAM 206 is equal to a predetermined value.

The first processor 202*a* is connected to the L2 cache memory 212 and fetches the uplink real-time data, stored in the L2 cache memory 212 by the first DMA controller 208, for baseband processing. The first processor 202*a* processes the uplink real-time data and stores intermediate uplink data, generated by processing of the uplink real-time data, in the L2 cache memory 212, to be utilized by upper layers such as layer 3.

Thus, the processors 202 process the uplink real-time data and store intermediate uplink data, generated by processing of the uplink real-time data, in the L2 cache memory 212. The processors 202 may even store the intermediate uplink data in the L2 cache memory 212 (or any other memory such as the L3 cache memory 216 and the RAM 214) that requires further processing by a processor 202 or the controller.

Further, the processors 202 receive intermediate downlink data from the upper layers to encode the intermediate downlink data according to communication standards, such as Long-Term Evolution (LTE), LTE-Advanced (LTE-A), High Speed Packet Access (HSPA) and other third generation partnership project (3GPP) standards, and generate the downlink real-time data. The processors 202 may store the downlink real-time data in the L2 cache memory 212 (or any other memory such as the L3 cache memory 216 and the RAM 214) for further processing by a processor 202 or the controller.

The second DMA controller 210 is connected to the L2 cache memory 212 and to the DL RAM 204 by way of the first system bus 220. The second DMA controller 210 is also connected to the third processor 202c and fetches the downlink real-time data stored in the L2 cache memory 212 from one or more processors 202 and stores the downlink real-time data in the DL RAM 204. The second DMA controller 210 may also fetch and store the downlink real-time data from the third processor 202c in the DL RAM 204. In one embodiment, the second DMA controller 210 is triggered by a timer (not shown) after a predetermined time period in order to perform transfer data. In another embodiment, the second DMA controller 210 is triggered by a counter (not shown) when the number of bytes of the downlink real-time data to be transferred is equal to a predetermined value. The location (i.e., component) from which the data is to be fetched is included in a descriptor, which may be provided to the second DMA controller 210 by a processor 202 or a controller (not shown). One descriptor for each data transfer cycle is provided to the second DMA controller 210.

The downlink real-time data is stored as I/Q components in the DL RAM 204. The antenna interface system 218 fetches the downlink real-time data from the DL RAM 204. The RF transceivers convert the I/Q components into analog signals before transmitting the data. Thus, the downlink real-time data is transmitted by the antenna interface system 218 as analog signals to the UE.

Thus, the L2 cache memory 212 is utilized to store the intermediate uplink data that is to be utilized by the upper layers and the intermediate downlink data that is to be utilized by the lower layers. The uplink real-time data and the downlink real-time data are stored in dedicated memories i.e., the UL RAM 206 and the DL RAM 204, respectively. Thus, there is a dedicated bandwidth for the uplink and downlink real-time data. This prevents loss of the real-time data (even if the L2 cache memory 212 is inaccessible), avoids congestion in the communication network, and hence, instances of communication failure. Further, since the UL RAM 206 and the DL RAM 204 serve a dedicated number of the processors 202, the L2 cache memory 212 does not store all of the uplink real-time data received by the BTS 200 and the downlink real-time data generated by the processors 202. Thus, the size of the L2 cache memory 212 can be reduced to achieve power and cost reduction. The L2 cache memory 212 may even store data of the L3 cache memory 216 and the RAM 214, and thereby reduce traffic for the RAM 214 and the L3 cache memory 216 as well as occurrence of cache misses. Thus, the BTS 200 provides high and dedicated bandwidth for time-critical data and ensures a deterministic data flow, which is required to stream the data. Moreover, since the first and second DMA controllers 208 and 210 are triggered by the timer (or the counter), a processor 202 (or the controller) that provides the descriptor is freed from the process of monitoring the data transfer (i.e., triggering the first and second DMA controllers 208 and 210). This increases the efficiency of the BTS 200.

It will be understood by those with skill in the art that the sizes of the UL RAM 206 and the DL RAM 204 depend on the number of antennas, depth requirement, speed of processors 202 and the antenna delay spread. Further, a processor 202 may be connected to the UL RAM 206 to fetch the uplink real-time data stored in the UL RAM 206. A processor 202 may even be connected to the DL RAM 204 to transfer the downlink data generated by the processor 202 to the DL RAM 204. In one embodiment, the two memories designed to buffer-up the baseband IQ samples were sized according to the device worst case deployment, where the worst case was four (4) LTE 20 MHz carriers, either 4 antennas×1 carrier, or 2 antennas×2 carriers; number of carriers=4; buffering_time=½ slot (>=3 LTE symbols)=0.25 ms; Number of IQ samples to buffer=N carriers*30720*buffering time=4*30720*0.25; Buffer size in Bytes=4*N_IQ/1024=120 Kbytes, which was then rounded up to 128 Kbytes. In other embodiments, the DL Ram was sized at 128 Kbytes and the UL Ram at 256 Kbytes.

Figure 3:
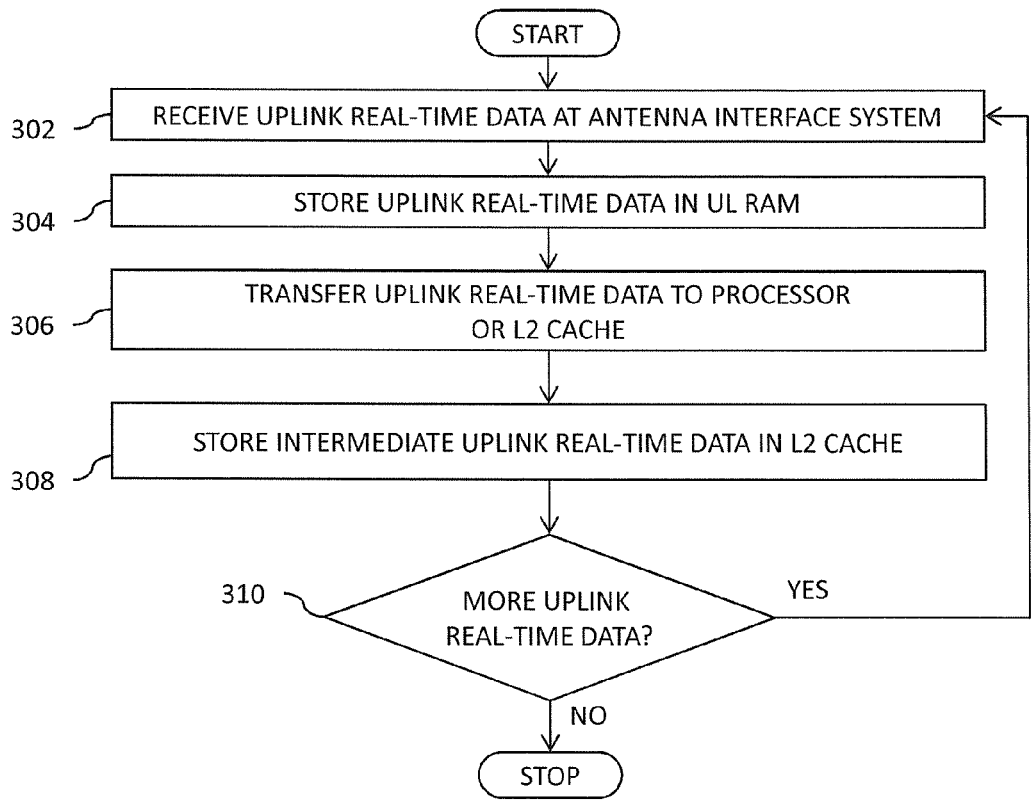
FIG. 3 is a flow chart illustrating a flow of uplink real-time data in the BTS of FIG. 2 in accordance with an embodiment of the present invention.

Referring now to FIG. 3, a flow chart illustrating the flow of the uplink real-time data in the BTS 200 in accordance with an embodiment of the present invention is shown. At step 302, the antenna interface system 218 receives the uplink real-time data from the UE. At step 304, the antenna interface system 218 stores the uplink real-time data in the UL RAM 206. At step 306, the first DMA controller 208 fetches the uplink real-time data from the UL RAM 206 and transfers the uplink real-time data to the L2 cache memory 212 or the second processors 202b. At step 308, the second processor 202b processes the uplink real-time data and stores the intermediate uplink data in the L2 cache memory 212. At step 310, the antenna interface system 218 checks to determine whether there is any more uplink real-time data. If at step 310, the antenna interface system 218 determines that there is more uplink real-time data, the antenna interface system 218 executes step 302.

Figure 4:
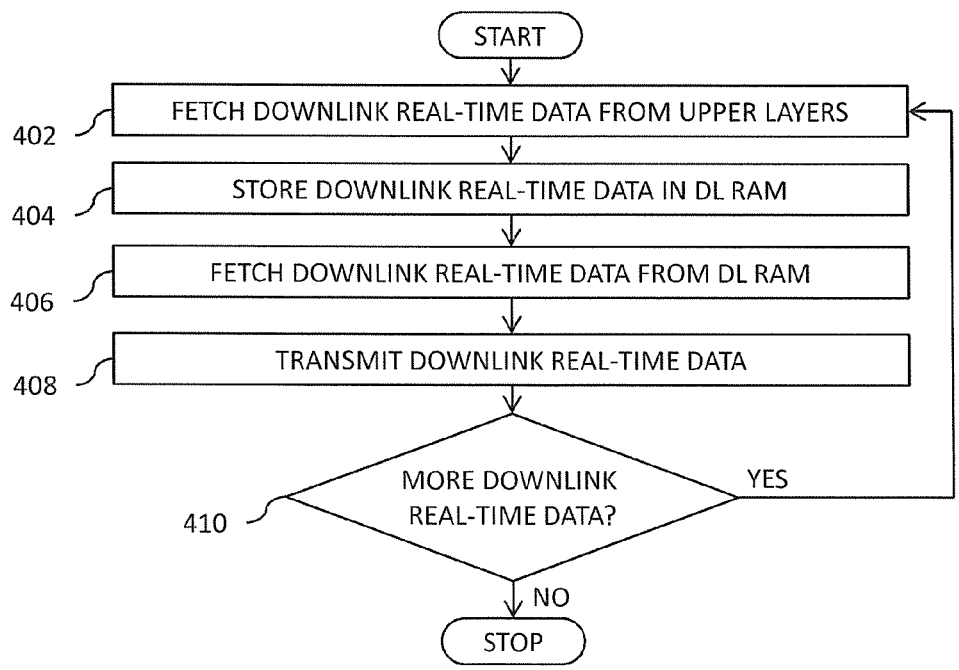
FIG. 4 is a flow chart illustrating a flow of downlink real-time data in the BTS of FIG. 2 in accordance with an embodiment of the present invention.

Referring now to FIG. 4, a flow chart illustrating the flow of the downlink RT data in the BTS 200 in accordance with an embodiment of the present invention is shown. At step 402, the second DMA controller 210 fetches the downlink RT data from at least one of the L2 cache memory 212 and the third processor 202c. At step 404, the second DMA controller 210 stores the downlink RT data in the DL RAM 204. At step 406, the AIS 218 fetches the downlink RT data from the DL RAM 204. At step 408, the AIS 218 transmits the downlink RT data to the UE. At step 410, the second DMA controller 210 checks to determine whether there is any more downlink RT data. If at step 410, the second DMA controller 210 determines that there is more downlink RT data, the second DMA controller 210 executes step 402.

While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims. Further, the phrase "based on" is intended to mean "based, at least in part, on" unless explicitly stated otherwise.

The invention claimed is:

1. A base transceiver station, comprising:
    an antenna interface system that receives first and second uplink real-time (RT) data;
    an uplink random-access memory (RAM) connected to the antenna interface system, wherein the antenna interface system stores the first and second uplink RT data in the uplink RAM;
    a first direct memory access (DMA) controller connected to the uplink RAM;
    a cache memory connected to the first DMA controller, wherein the first DMA controller fetches the first uplink RT data from the uplink RAM and stores the first uplink RT data in the cache memory;
    a set of processors including a first processor connected to the cache memory, wherein the first processor fetches the first uplink RT data from the cache memory for baseband decoding, and a second processor connected to the first DMA controller, wherein the first DMA controller fetches the second uplink RT data from the uplink RAM and provides the second uplink RT data to the second processor for baseband decoding;
    a second DMA controller connected to at least one processor of the set of processors and the cache memory; and
    a downlink RAM connected to the second DMA controller and the antenna interface system,
    wherein the second DMA controller fetches downlink RT data from at least one of the cache memory and the at least one processor and stores the downlink RT data in the downlink RAM,
    wherein the antenna interface system fetches the downlink RT data from the downlink RAM and transmits the downlink RT data, and
    wherein the first and second uplink RT data are stored in the uplink RAM as in-phase and quadrature-phase components, and the downlink RT data is stored in the downlink RAM as in-phase and quadrature-phase components.

2. The base transceiver station of claim 1, wherein the uplink RAM is a dedicated RAM for storing the first and second uplink RT data and the downlink RAM is a dedicated RAM for storing the downlink RT data, and wherein the uplink and downlink RAMs are separate from the cache memory.

3. A method implemented in a base transceiver station, the method comprising:
    receiving first and second uplink real-time (RT) data at an antenna interface system;
    storing the first and second uplink RT data in an uplink random access memory (RAM) by the antenna interface system, wherein the uplink RAM is a dedicated RAM for storing the first and second uplink RT data;
    fetching the first uplink RT data from the uplink RAM by a first direct memory access (DMA) controller;
    storing the first uplink RT data in a cache memory by the first DMA controller;
    fetching the first uplink RT data from the cache memory by a first processor of a set of processors for baseband decoding;
    fetching the second uplink RT data from the uplink RAM by the first DMA controller;
    providing the second uplink RT data to a second processor of the set of processors by the first DMA controller for baseband decoding;
    fetching downlink RT data from at least one of the cache memory and a processor of the set of processors by a second DMA controller;
    storing the downlink RT data in a downlink RAM by the second DMA controller, wherein the downlink RAM is a dedicated RAM for storing the downlink RT data;
    fetching the downlink RT data from the downlink RAM by the antenna interface system; and
    transmitting the downlink RT data by the antenna interface system, and
    wherein the first and second uplink RT data are stored in the uplink RAM as in-phase and quadrature-phase components, and the downlink RT data is stored in the downlink RAM as in-phase and quadrature-phase components.

* * * * *